Sept. 20, 1966    A. WESSTROM ET AL    3,273,880
BRAKE SHOE AND LINING HOLDING FIXTURE
Original Filed Dec. 20, 1962
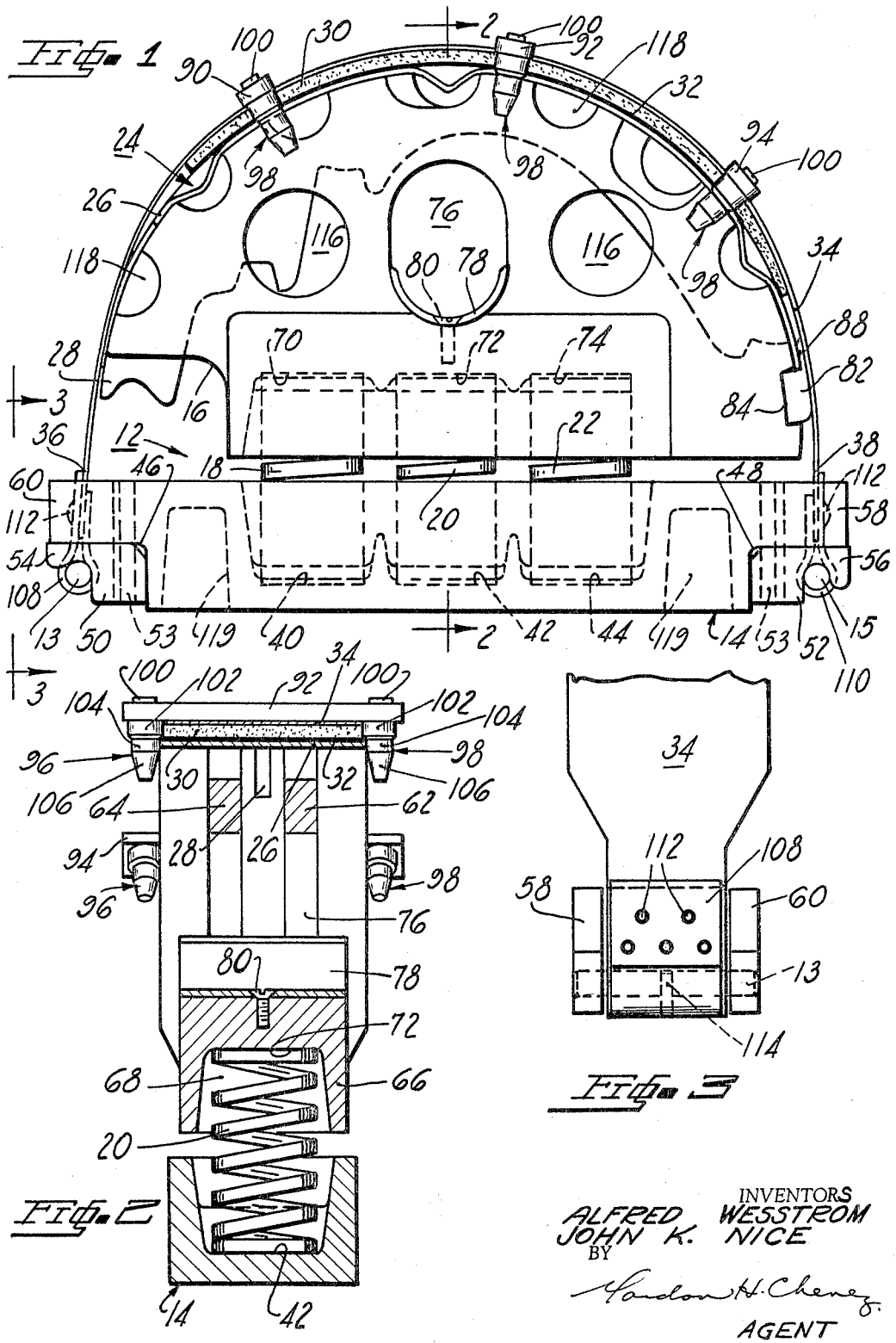
INVENTORS
ALFRED WESSTROM
JOHN K. NICE
BY
Gordon H. Cheney
AGENT

United States Patent Office 3,273,880
Patented Sept. 20, 1966

3,273,880
BRAKE SHOE AND LINING HOLDING FIXTURE
Alfred Wesstrom and John K. Nice, South Bend, Ind., assignors to The Bendix Corporation, South Bend, Ind., a corporation of Delaware
Continuation of application Ser. No. 246,261, Dec. 20, 1962. This application June 4, 1964, Ser. No. 372,654
10 Claims. (Cl. 269—254)

This application is a continuation of my copending application Serial No. 246,261 filed December 20, 1962, now abandoned.

This invention relates to holding fixtures and, in particular to a fixture for holding a brake shoe and associated brake lining together during a bonding operation whereby the brake lining is bonded to the brake shoe by an adhesive under heat and pressure.

It is the conventional practice to utilize holding fixtures for holding a brake shoe and associated brake lining in clamped engagement during a bonding operation which operation normally consists of placing the assembled brake shoe and lining in an oven at a predetermined temperature for a predetermined time to effect cementing of the lining to the shoe. It has been found that the prior art holding fixtures are not entirely satisfactory in that said fixtures often fail to maintain the lining in the proper position relative to the brake shoe during the bonding operation and further often fail to maintain a minimum compression load on the brake lining during the bonding operation which compression load is necessary to effect satisfactory bonding of the cemented brake lining to the brake shoe. The abovementioned misalignment and/or unsatisfactory bonding of brake lining and brake shoe usually results in a rejection or scrapping of the lined shoe which rejection or scrapping even at relatively low percentage rates in high production items such as lined brake shoes which have a relatively small profit margin constitutes a significant problem.

It is therefore an object of the present invention to provide a holding fixture for holding a brake shoe and associated brake lining together in fixed relative positions during a bonding operation.

It is another object of the present invention to provide a holding fixture for holding a brake shoe and associated brake lining together in fixed relative positions under a predetermined compression load during a bonding operation.

It is still another object of the present invention to provide a brake shoe and lining bonding holding fixture which is easily assembled a and disassembled.

Other objects and advantages of the present invention will become apparent from the following description taken with the accompanying drawings wherein:

FIGURE 1 represents a plan view of the present invention;

FIGURE 2 represents a sectional view taken on line 2—2 of FIGURE 1; and

FIGURE 3 represents a sectional view taken on line 3—3 of FIGURE 1.

Referring to FIGURE 1, numeral 12 designates a holding fixture having a rectangular base member 14 and an upper member 16 resiliently supported by three compression springs 18, 20 and 22 interposed between base member 14 and member 16. The upper member 16 is adapted to support an arcuate brake shoe 24 having a rim 26 and a web 28 fixedly secured thereto and extending at a right angle thereto. A segment of brake lining 30 provided with a coating of bonding cement 32 on one side thereof is pressed against the surface of rim 26 by a flexible metal band 34 which has opposite end portions 36 and 38 removably secured to base member 14 by means of rods 13 and 15, respectively. As shown in FIGURE 1 the springs 18, 20 and 22 are in a compressed condition with the force derived therefrom acting upwardly against upper member 16 thereby maintaining a preload on brake lining 30.

The base member 14 is provided with circular recesses 40, 42 and 44 which receive one end of springs 18, 20 and 22, respectively, thereby retaining said springs in spaced apart relationship. The opposite end portions of base member 14 are notched as at 46 and 48 to receive bifurcated anchor members 50 and 52, respectively, which are fixedly secured to base member 14 by any suitable fastening means such as pins 53 and which are each provided with bifurcations 54 and 56. The end portions of base member 14 are each provided with bifurcations 58 and 60 which are aligned with bifurcations 54 and 56.

The upper member 16 is provided with parallel spaced apart walls 62 and 64 and an integral base portion 66 which has a cavity 68 formed therein. The bottom of cavity 68 is provided with circular recesses 70, 72 and 74 which receive the ends of springs 18, 20 and 22, respectively. A generally elliptically-shaped opening 76 formed in walls 62 and 64 is provided with a bearing member 78 fixedly secured to base portion 66 by any suitable means such as screw member 80.

The brake shoe 24 is located circumferentially on walls 62 and 64 by a locating lug 82 which is fixedly secured in a recess 84 in wall 62 by any suitable means such as a screw member or the like, not shown. A flange 88 formed on lug 82 overlaps the rim 26 when the brake shoe 24 is in position as shown in FIGURE 1.

Three spaced apart bars 90, 92 and 94 are fixedly secured to band 34 by any suitable menas such as rivets or the like, not shown. Each bar 90, 92 and 94 carries a pair of spaced apart locating pins 96 and 98 having integral dowel pins 100 which extend through the bars and are peened over to thereby fixedly secure the locating pins 96 and 98 in position. The locating pins 96 and 98 are each provided with a larger diameter portion 102, a smaller diameter portion 104 and a tapered end portion 106. As shown in FIGURE 2, the locating pins 96 and 98 are spaced such that the brake lining 30 fits between the larger diameter portions 102 and the rim 26 fits between the smaller diameter portions 104 which arrangement establishes positive alignment of the brake lining 30 with the rim 26. The tapered end portions 106 are provided to guide the pins 96 and 98 when the band 34 is positioned over the brake lining 30. The end portions 36 and 38 of band 34 are provided with fastening members 108 and 110, respectively, which are looped around the respective rods 13 and 15 and which are fixedly secured to band 34 by a plurality of rivets 112. Pins 114 serve to hold rods 13 and 15 in position in the respective fastening members 108 and 110.

The weight of the holding fixture 12 may be minimized by making the base member 14 and upper member 16 of aluminum or other suitable lightweight metal. Additional weight reduction may be gained by providing openings 116 and recesses 118 in upper member 16 and recesses 119 in base member 14.

Assuming the bonding operation to be complete whereby the brake lining 30 is secured to the brake shoe 24, the shoe and attached lining may be removed from the fixture 12 by any suitable apparatus, not shown, capable of actuating the upper member 16 relative to the base member 14 or the base member 14 relative to the upper member 16 to thereby compress the springs 18, 20 and 22 and permit uncoupling of the rod 13 from anchor member 50. Preferably, such apparatus takes the form of a power operated table having a fixed arbor, not shown. The fixture 12 is positioned on the power operated table with the fixed arbor extending through opening 76 and bearing against bearing member 78. The power operated table is energized causing base member 14 to move toward upper member 16 which, in turn, is held fixed by the arbor engaged therewith such that springs 18, 20 and 22 are compressed sufficiently to permit the rod 13 to be slipped out of the anchor member 50. The flexible band 34 may be then lifted away from the brake shoe 24 and the shoe removed from the upper member 16.

The fixture 12 may be assembled for the next bonding operation by placing a brake shoe 24 on the upper member 16 and sliding the shoe 24 in position against locating lug 82. The brake lining 30 with bonding cement applied to the underside thereof is positioned on brake shoe 24 and flexible band 34 drawn thereagainst. It will be noted that the locating pins 96 and 98 effectively guide the brake lining 30 into position on shoe 24 and prevent lateral displacement of the lining 30 relative to the shoe 24. The rod 13 is slipped into position on anchor member 50 and the power operated table subsequently energized to permit base member 14 to move away from upper member 16 under the influence of springs 18, 20 and 22 thereby locking the rods 13 and 15 in position against anchor members 50 and 52, respectively. The brake lining 30 is held in a compressed condition against brake shoe 24 by virtue of the flexible band 34 which is held in tension by the springs 18, 20 and 22. It has been found that a reliable bond between the lining 30 and rim 26 will be obtained with a bonding pressure of approximately 55 to 60 pounds per square inch thus enabling a reliable bond to be obtained during the heating process. In the event that the holding fixture 12 is used to bond brake linings of various sizes, the springs 18, 20 and 22 would be selected in accordance with the lining having the largest area to provide the minimum bonding pressure of 55 to 60 pounds per square inch in which case the bonding pressure would be proportionately higher when a lining of smaller area is installed in the same fixture 12. However, the higher bonding pressure is not objectionable. The bonding operation is completed by placing the fixture 12 with attached shoe 24 and lining 30 in an oven at the required temperature for a predetermined time to permit the bonding cement 32 to become plastic thereby bonding the lining 30 to the shoe 24.

It will be understood that various changes and modifications in the holding fixture shown and described may be made by those persons skilled in the art without departing from the spirit of the invention.

We claim:

1. A holding fixture for use in bonding brake lining to a brake shoe comprising:
   a base member;
   an upper member having a curved portion adapted to support an arcuate brake shoe and associated brake lining;
   a flexible metal band having a plurality of locating pins fixedly secured thereto and engageable with said brake shoe and brake lining for holding the same in fixed relative positions;
   said flexible band being adapted to encircle said brake lining and brake shoe and provided with end portions removably secured to said base member;
   and resilient means operatively connected to said base member and said upper member for urging said members apart to thereby load said flexible band in tension and compress said lining against said shoe.

2. A holding fixture for use in bonding brake lining to a brake shoe comprising:
   a base member;
   an upper member having a curved portion adapted to support an arcuate brake shoe and associated brake lining;
   said shoe and lining being adapted to be bonded together by an adhesive under the influence of heat and pressure;
   a flexible metal band for encircling said brake shoe and lining and provided with opposite end portions removably secured to said base member;
   a plurality of locating pins fixedly secured to said flexible band and engageable with said shoe and lining for holding the same in fixed relative positions;
   and spring means operatively connected to said base member and said upper member for urging said members apart so as to load said flexible band in tension and compress said brake lining against said brake shoe.

3. A holding fixture for use in bonding brake lining to a brake shoe comprising:
   a base member having opposite end portions provided with first and second anchor members, respectively, fixedly secured thereto;
   an upper member having a curved portion adapted to support an arcuate brake shoe and associated brake lining;
   said shoe and lining being provided with an adhesive for bonding said shoe and lining together under the influence of heat and pressure;
   a flexible metal band for encircling said shoe and lining and having first and second end portions removably secured to said first and second anchor members, respectively;
   a plurality of spaced apart locating pins fixedly secured to said flexible band and engageable with the lateral edges of said brake shoe and said brake lining for maintaining said shoe and lining in fixed relative lateral positions;
   and spring means operatively connected to said base member and said upper member for urging said members apart so as to load said flexible band in tension and compress said brake lining against said brake shoe with a predetermined force.

4. A holding fixture for use in bonding brake lining to a brake shoe comprising:
   a base member having opposite end portions;
   an upper member having a curved portion adapted to support an arcuate brake shoe and associated brake lining, and being provided with a locating lug engageable with one end of said shoe for positioning said shoe circumferentially along said curved portion;
   said shoe and lining being provided with an adhesive for bonding said shoe and lining together under the influence of heat and pressure;
   a flexible metal band for encircling said shoe and lining and having first and second end portions removably secured to said opposite end portions;
   a plurality of spaced apart locating pins fixedly secured to said flexible band and engageable with the lateral edges of said brake shoe and said brake lining for maintaining said shoe and lining in fixed relative lateral positions;
   and spring means operatively connected to said base member and said upper member for urging said members apart so as to load said flexible band in tension and compress said brake lining against said brake shoe with a predetermined force.

5. A holding fixture for use in bonding brake lining to a brake shoe comprising:
   a base member;
   an upper member having a portion adapted to support a brake shoe and associated brake lining;
   a pressure member provided with end portions secured to said base member, at least one of which end portions is readily detachable from said base member to permit movement of said pressure member relative to said base member for loading and unloading said brake shoe and associated lining relative to said upper member supporting the same; said upper member and said pressure member being so positionable one with respect to the other as to receive said brake shoe and associated lining therebetween;

and resilient means operatively connected to said base member and said upper member for urging the same apart to load said pressure member and compress said lining against said shoe.

6. A holding figure for use in bonding brake lining to a brake shoe comprising:
   a base member;
   an upper member having a portion adapted to support a brake shoe and associated brake lining;
   a pressure member provided with a plurality of locating elements secured thereto and engageable with said brake shoe and brake lining for holding the same in fixed relative positions;
   said pressure member being adapted to engage said brake lining and having end portions removably secured to said base member;
   and resilient means operatively connected to said base member and said upper member for urging the same apart to load said pressure member and compress said lining against said shoe.

7. A holding fixture for use in bonding brake lining to a brake shoe comprising:
   a base member;
   an upper member having a curved portion adapted to support an arcuate brake shoe and associated brake lining;
   said shoe and lining being provided with an adhesive for bonding said shoe and lining together under the influence of heat and pressure;
   a pressure member having a curved portion adapted to bear against said lining and being provided with locating elements secured thereto adapted to engage the lateral edges of said brake shoe and said brake lining for maintaining the same in fixed relative lateral positions;
   said pressure member having first and second end portions secured to said base member;
   and resilient force producing members operatively connected to said base member and said upper member for urging the same apart so as to load said pressure member and compress said brake lining against said brake shoe with a predetermined force.

8. A holding fixture for use in bonding brake lining to a brake shoe comprising:
   a base member;
   an upper member having a portion adapted to support a brake shoe and associated brake lining;
   a flexible metal band having a plurality of spaced apart locating elements secured thereto and engageable with said brake shoe and brake lining for holding the same in fixed relative positions;
   said flexible band being adapted to bear against said brake lining and provided with end portions secured to said base member;
   and resilient force producing means operatively connected to said base member and said upper member for urging the same apart to load said flexible band in tension and compress said lining against said shoe with a predetermined force.

9. A holding fixture as claimed in claim 7 wherein said resilient force producing means includes a compression spring mounted between said base member and said upper member.

10. A holding fixture for use in bonding brake lining to a brake shoe comprising:
    a base member;
    an upper member having a portion adapted to support a brake shoe and associated lining;
    a pressure member adapted to overlay said brake shoe and associated lining and provided with end portions secured to said base member;
    resilient means operatively connected to said base member and said upper member for urging the same apart to load said pressure member and compress said brake shoe and associated lining together thereby generating a substantially constant force per unit area over the bond surface of said brake shoe and associated lining; and
    a plurality of locating elements secured to one of said upper and pressure members and engageable with said brake shoe and associated lining for holding the same in fixed relative positions.

References Cited by the Examiner

UNITED STATES PATENTS

| | | | |
|---|---|---|---|
| 2,066,936 | 1/1937 | Jahraus | 100—93 |
| 2,416,427 | 2/1947 | Bonawit et al. | 100—93 |
| 2,513,800 | 7/1950 | Hendrick | 269—130 |

ROBERT C. RIORDON, *Primary Examiner.*

B. S. MOWRY, *Assistant Examiner.*